(12) United States Patent
Feng

(10) Patent No.: US 9,819,304 B2
(45) Date of Patent: Nov. 14, 2017

(54) PORTABLE SOLAR PANEL SYSTEM AND METHOD

(71) Applicant: Aiguo Feng, Fremont, CA (US)

(72) Inventor: Aiguo Feng, Fremont, CA (US)

( * ) Notice: Subject to any disclaimer, the term of this patent is extended or adjusted under 35 U.S.C. 154(b) by 529 days.

(21) Appl. No.: 14/160,362

(22) Filed: Jan. 21, 2014

(65) Prior Publication Data

US 2015/0207005 A1   Jul. 23, 2015

(51) Int. Cl.
*G01J 1/20* (2006.01)
*H02S 20/32* (2014.01)
*F24J 2/38* (2014.01)
*F24J 2/54* (2006.01)
*F24J 2/52* (2006.01)

(52) U.S. Cl.
CPC ............... *H02S 20/32* (2014.12); *F24J 2/38* (2013.01); *F24J 2/542* (2013.01); *F24J 2/5266* (2013.01); *F24J 2002/5458* (2013.01); *F24J 2002/5462* (2013.01); *Y02E 10/47* (2013.01)

(58) Field of Classification Search
CPC .... H02S 20/30; H02S 20/32; F24J 2/36; F24J 2/38; F24J 2/54; F24J 2/542
USPC ...................................................... 250/203.4
See application file for complete search history.

(56) References Cited

U.S. PATENT DOCUMENTS

| | | | | |
|---|---|---|---|---|
| 4,256,088 A * | 3/1981 | Vindum | ...................... | F24J 2/10 126/571 |
| 4,883,340 A * | 11/1989 | Dominguez | ............. | F21S 11/00 126/576 |
| 5,191,875 A * | 3/1993 | Edling | ..................... | F24J 2/085 126/570 |
| 5,323,593 A * | 6/1994 | Cline | ................... | A01D 34/008 136/291 |
| 6,396,239 B1 * | 5/2002 | Benn | ......................... | F24J 2/36 307/150 |
| 8,290,745 B2 * | 10/2012 | Singamsetti | ............ | H02S 50/10 320/101 |
| 2002/0179138 A1 * | 12/2002 | Lawheed | ................. | F24J 2/085 136/246 |
| 2002/0180404 A1 * | 12/2002 | Benn | ......................... | F24J 2/36 320/101 |
| 2010/0024861 A1 * | 2/2010 | Cabanillas Saldana | . | F24J 2/542 136/244 |
| 2010/0180886 A1 * | 7/2010 | Chang | ....................... | F24J 2/38 126/601 |

(Continued)

FOREIGN PATENT DOCUMENTS

WO   WO 2012027418 A1 *   3/2012   .............. F24J 2/525

OTHER PUBLICATIONS

Google image inquiry "Solar Tracker" Mar. 7, 2014.
Google image inquiry "Solar Tracker" Mar. 7, 2014, images returned, 6 pages.

*Primary Examiner* — Georgia Y Epps
*Assistant Examiner* — Kevin Wyatt
(74) *Attorney, Agent, or Firm* — George B. Leavell

(57) ABSTRACT

A portable solar panel system and method includes a support structure, one or more solar panels mounted on the support structure, at least three wheels coupled to the support structure and rotatably supporting the support structure on a surface, a controller, a sunlight monitor coupled to the controller and a tracking drive system coupled to the controller and mechanically linked to at least one of the at least three wheels.

18 Claims, 14 Drawing Sheets

(56) References Cited

U.S. PATENT DOCUMENTS

2012/0153727 A1* 6/2012 Takano ................ H02M 7/483
                                                    307/75
2014/0014159 A1* 1/2014 Polk .................... H01L 31/0522
                                                    136/246
2015/0308409 A1* 10/2015 Patel ...................... F03D 7/06
                                                    290/50

* cited by examiner

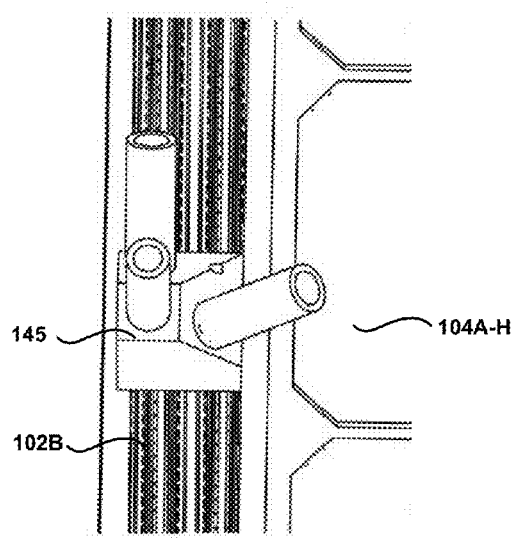
FIG. 4A
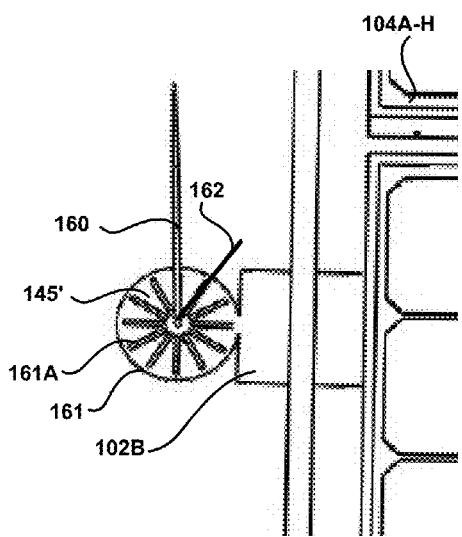
FIG. 4D
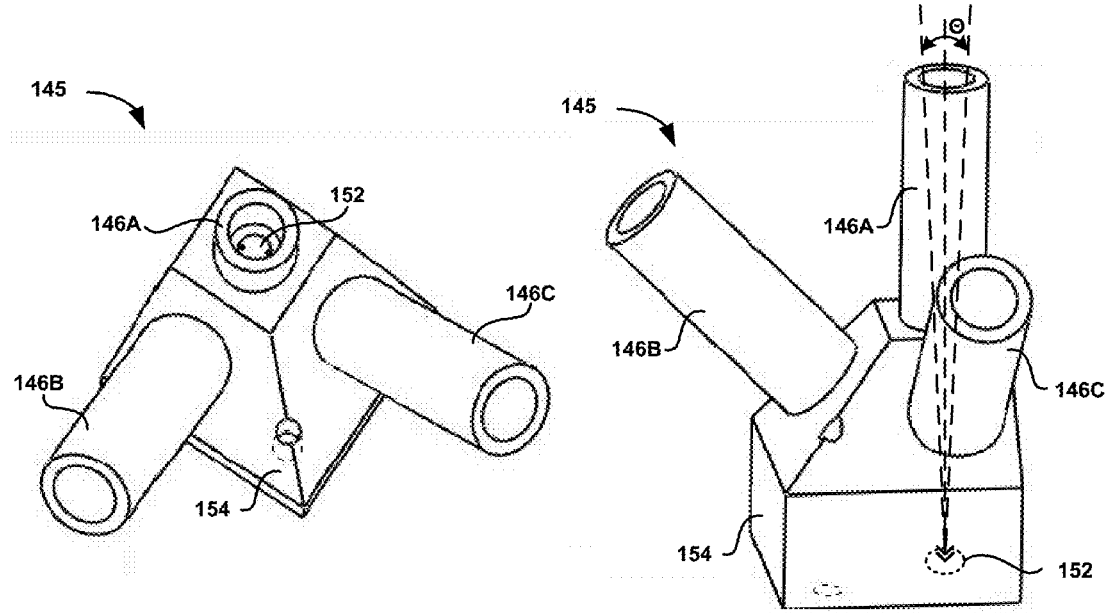
FIG. 4B
FIG. 4C

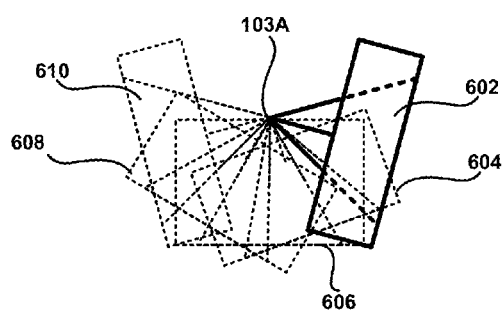
FIG. 6C1
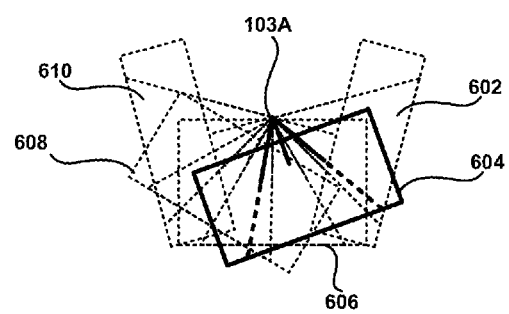
FIG. 6C2
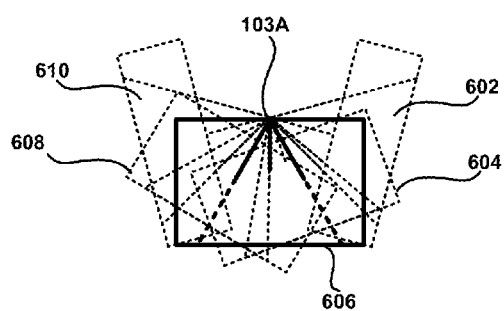
FIG. 6C3
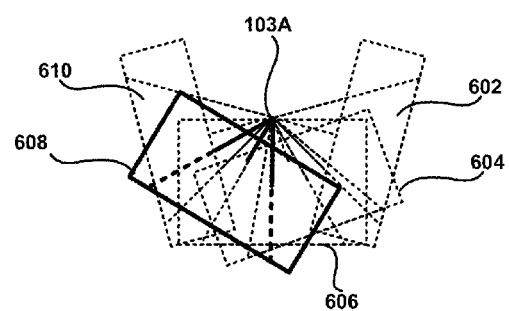
FIG. 6C4
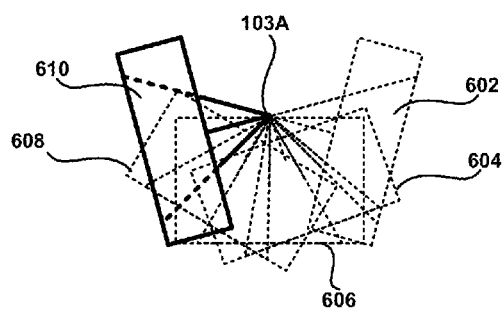
FIG. 6C5

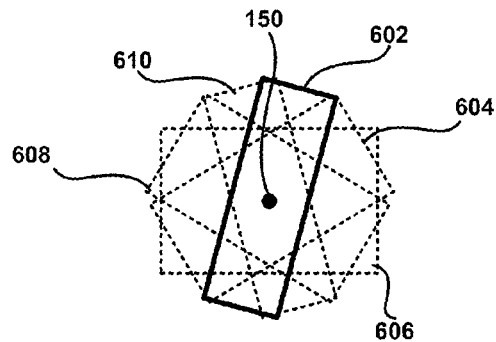
FIG. 6D1
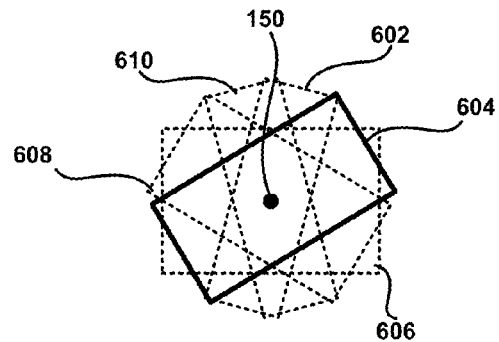
FIG. 6D2
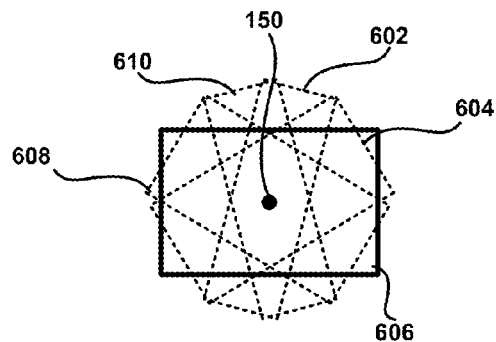
FIG. 6D3
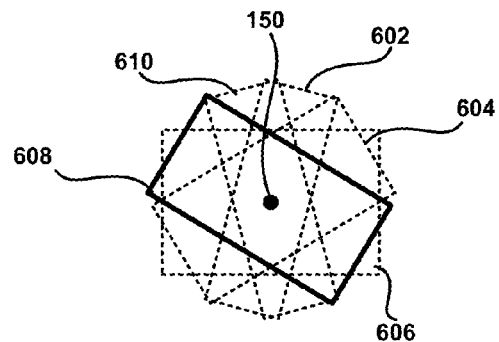
FIG. 6D4
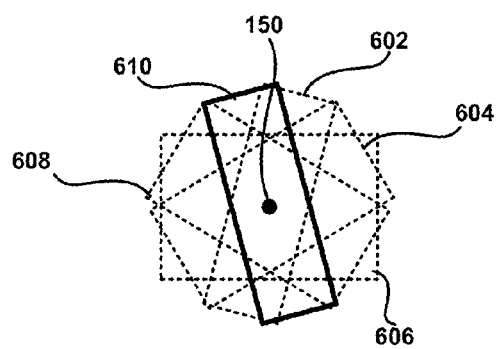
FIG. 6D5

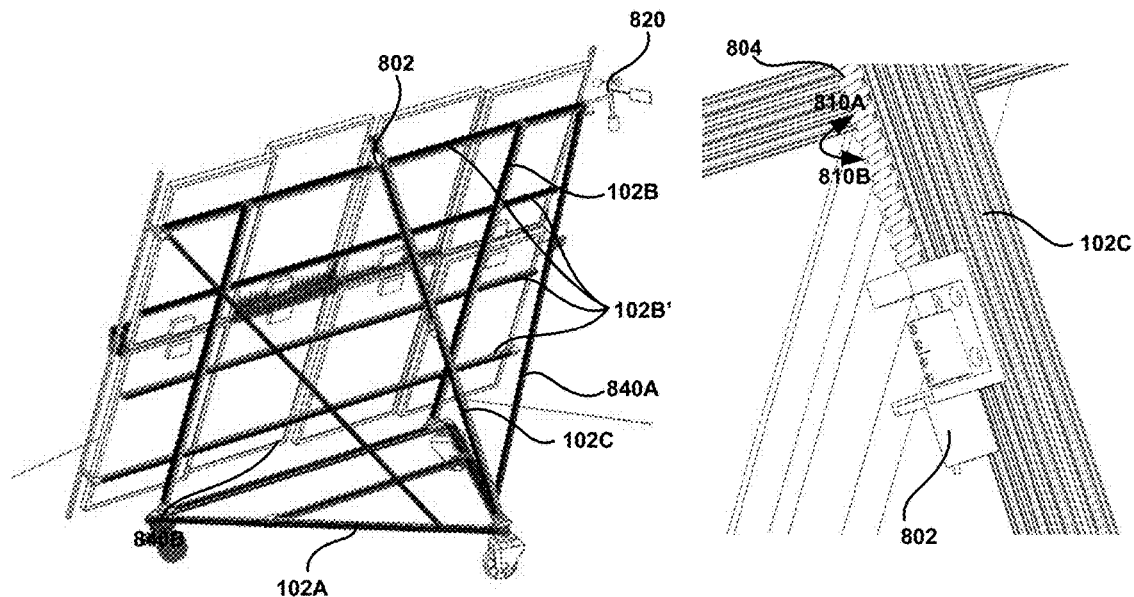
FIG. 8A
FIG. 8B
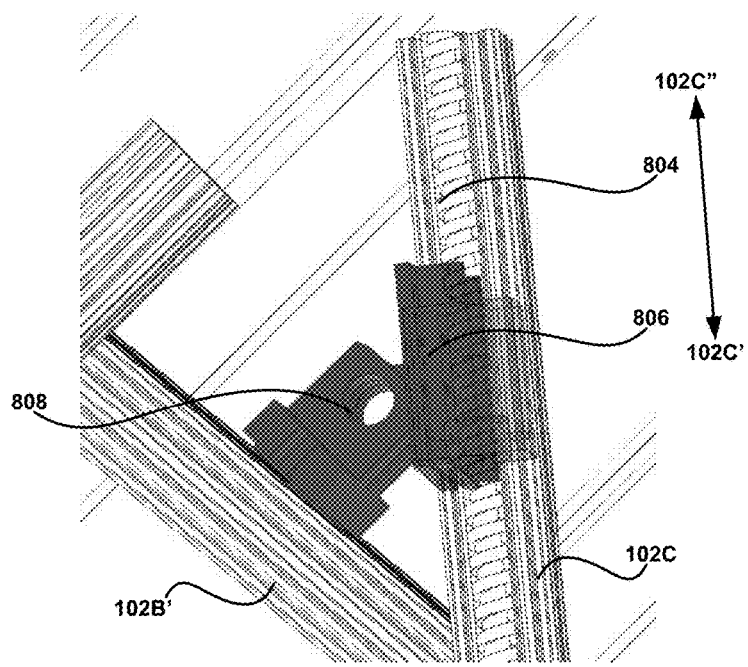
FIG. 8C

PORTABLE SOLAR PANEL SYSTEM AND METHOD

BACKGROUND

The present invention relates generally to photovoltaic solar panel deployment systems and methods, and more particularly, to systems and method for deploying a portable photovoltaic system and solar panel tracking systems.

Typical photovoltaic solar cell array (solar panel) deployment systems and methods and solar panel tracking systems and methods are very complex, expensive and require excessive time and materials to complete. As a result, the typical solar panel deployment systems and methods consume much of the energy the solar panel systems can produce during the service life of the solar panel system. By way of example, typical solar panel deployment systems and methods rely on large steel structures to support the solar panels. The large steel structures require substantial labor and material to install and concrete foundations to support the steel structures and other site preparations. In another example, typical roof top solar panel installations require expensive structural study of and potential structural improvements to the existing roof structure and the existing roofing conditions, in addition to the steel structural support systems.

Further, a typical solar panel deployment systems and methods often do not include actuating systems for tracking the sun as the sun passes overhead from sunrise to sunset. The tracking systems increase the power production of the solar panels but at substantial additional expense. By way of example, many moving parts (e.g., gears, chains, levers and pivots) are typically required to provide the ability for the typical solar panels to track the sun. These moving parts each increase the cost and complexity of the solar panel support structure while also increasing the maintenance requirements and decreasing the reliability. In addition, typical tracking control systems require high power and expensive electronics to move the solar panel position and orientation for maximum electric power output.

In view of the foregoing, there is a need for a simplified system, method and apparatus for deploying, using and operating solar panels.

SUMMARY

Broadly speaking, the present invention fills these needs by providing a simplified, portable solar panel system capable of tracking the sun. It should be appreciated that the present invention can be implemented in numerous ways, including as a process, an apparatus, a system, computer readable media, or a device. Several inventive embodiments of the present invention are described below.

One embodiment provides a portable solar panel system including a support structure, one or more solar panels mounted on the support structure, at least three wheels coupled to the support structure and rotatably supporting the support structure on a surface, a controller, a sunlight monitor coupled to the controller and a tracking drive system coupled to the controller and mechanically linked to at least one of the at least three wheels.

The support structure can include a base and a panel support flexibly coupled to the base. The tracking drive system can include a panel drive system coupled between the base and the panel support capable of selectively varying an inclination angle between the base and the panel support.

The support structure can include a base, a panel support flexibly coupled to the base and a support strut and/or at least one stabilizer.

The solar panel system can also include a power conditioner coupled to the at least one solar panel. The sunlight monitor can be mounted on the support structure. The sunlight monitor can include a light sensitive element and at least one tunnel. The sunlight monitor can include a sunlight detection angle of between about 2 and about 20 degrees.

The controller can include logic for driving at least one of the at least three wheels to rotate the support structure to achieve a desired output from the sunlight monitor.

Another embodiment provides a method for tracking sun with a portable solar panel system. The portable solar panel system including a support structure, one or more solar panels mounted on the support structure, at least three wheels coupled to the support structure and rotatably supporting the support structure on a surface, a controller, a sunlight monitor coupled to the controller and a tracking drive system coupled to the controller and mechanically linked to at least one of the at least three wheels. The method can also include driving at least one of the at least three wheels to rotate the support structure to achieve a desired output from the sunlight monitor.

The method can also include varying an inclination angle between a base and a panel support of the support structure to achieve the desired output from the sunlight monitor.

Driving at least one of the at least three wheels to rotate the support structure to achieve a desired output from the sunlight monitor can also include laterally translating the support structure and/or rotating the support structure around a selected fixed point. The selected fixed point can be one of the at least three wheels or any selected point in the support structure. Driving at least one of the at least three wheels to rotate the support structure to achieve a desired output from the sunlight monitor can also include laterally translating the support structure and rotating the support structure around one or more selected fixed points.

The method can also include detecting an adverse weather condition and minimizing an angle of inclination. The method can also include detecting contamination on a surface of the at least one solar panel and cleaning the surface of the at least one solar panel.

Yet another embodiment provides a solar panel system including a support structure having a base and a panel support flexibly coupled to the base, a one or more solar panels mounted on the panel support, three wheels coupled to the support structure and rotatably supporting the support structure on an uneven surface. The system can also include a controller, a sunlight monitor coupled to the controller, the sunlight monitor being mounted on the support structure, wherein the sunlight monitor includes a sunlight detection angle of between about 2 and about 5 degrees and a tracking drive system coupled to the controller and mechanically linked to at least one of the at least three wheels, wherein the tracking drive system includes a panel drive system coupled between the base and the panel support capable of selectively varying an inclination angle between the base and the panel support.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIGS. 4A-C are simplified diagrams of the sunlight monitor 145, in accordance with embodiments of the present invention.

FIG. 4D is a simplified diagram of an alternative sunlight monitor, in accordance with embodiments of the present invention.

FIGS. 8A-C are more detailed schematic diagrams of the panel drive system, in accordance with embodiments of the present invention.

DETAILED DESCRIPTION

Several exemplary embodiments for simplified, portable solar panel systems and methods capable of tracking the sun will now be described. It will be apparent to those skilled in the art that the present invention may be practiced without some or all of the specific details set forth herein.

Solar power systems promise to provide low cost, low maintenance, low operating cost power for a long service life. The actual power generated by the solar power system is partially offset by the expenses in materials, labor and energy required to produce, deploy and operate the solar power system. These expenses of both money and labor include expenditures for: manufacturing the photovoltaic cell arrays (solar panels), delivery, installation labor, installation structure, and long term operations and maintenance. The system described herein addresses each of these expenditures by providing a simplified, modular and even portable solar panel system.

Figure 1A:
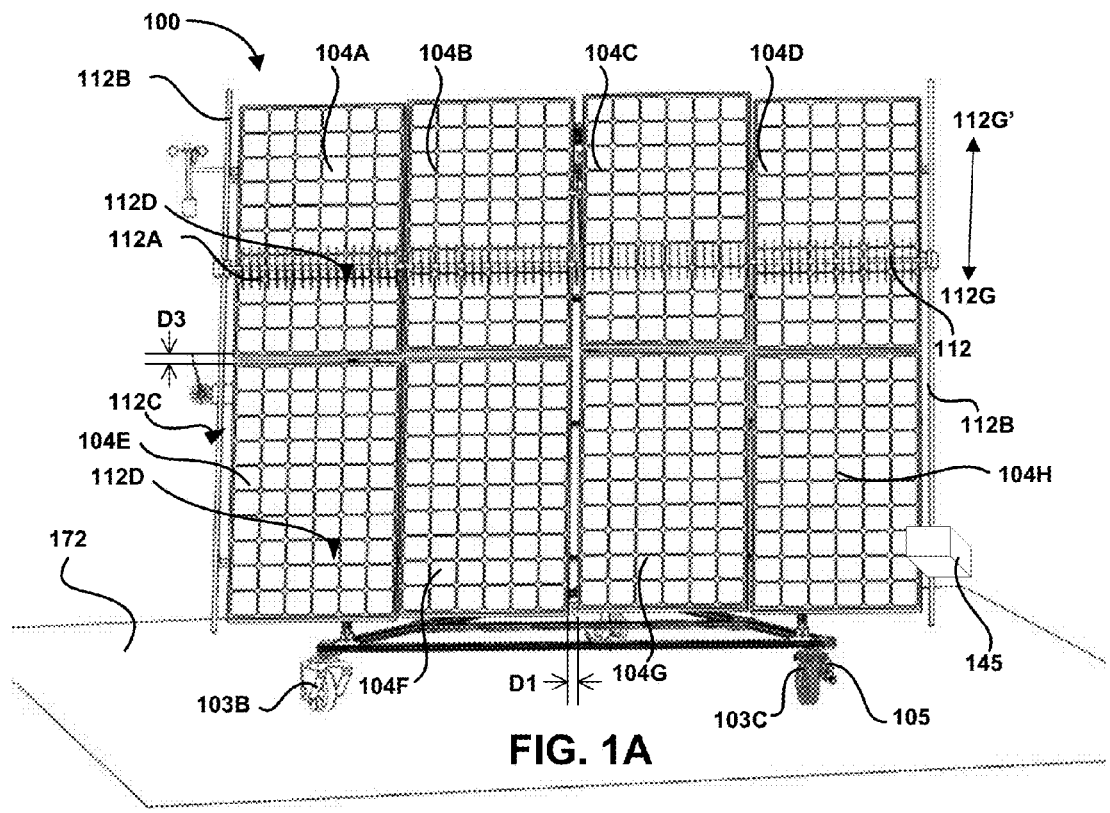
FIG. 1A is a front view of a portable solar power system, in accordance embodiments of the present invention.
Figure 1B:
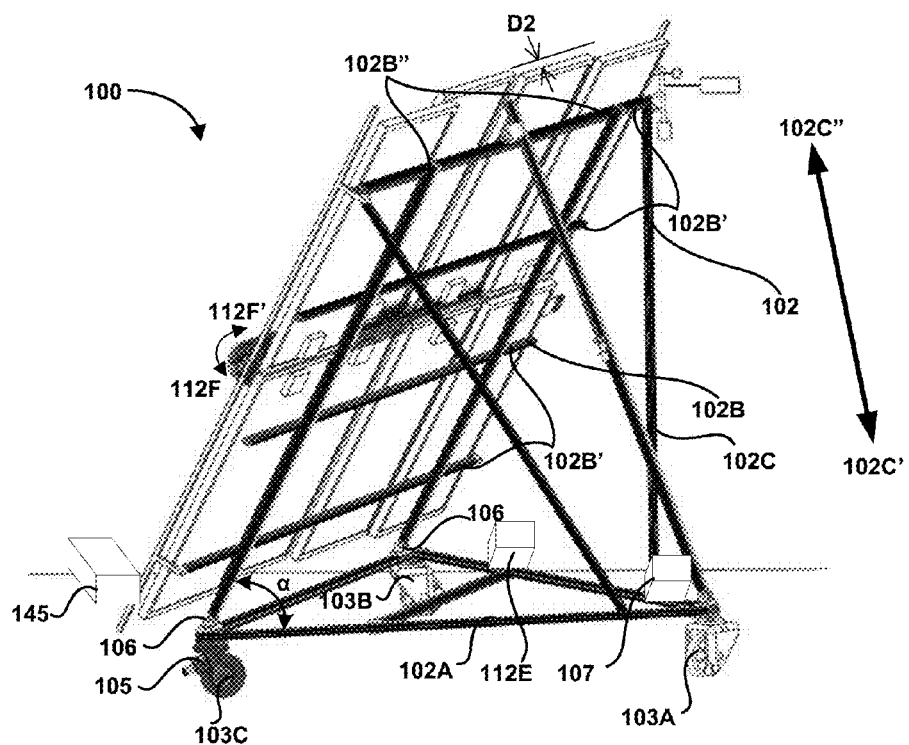
FIG. 1B is a back side view of the portable solar power system, in accordance embodiments of the present invention.

FIG. 1A is a front view of a portable solar power system 100, in accordance embodiments of the present invention. FIG. 1B is a back side view of the portable solar power system 100, in accordance embodiments of the present invention. The portable solar power system 100 includes a frame 102 and multiple solar panels 104A-H mounted on the frame. The frame 102 includes a base 102A, a panel support 102B and a support strut 102C. The base 102A includes at least three wheels 103A-C. At least one of the wheels 103C includes a wheel drive system 105. Alternatively or additionally, the at least three wheels 103A-C can include other types of supports such as skis or skids such as may be used for sliding across a slick surface such as snow or ice. Alternatively or additionally, the at least three wheels 103A-C can include other types of supports such as floats such as may be used for supporting the support structure over water.

The at least three wheels 103A-C support the base 102A on the surface 172. The surface can be the ground or any other surface. It should be noted that while the surface 172 is depicted as being substantially horizontal and flat, the surface can be uneven or tilted or slanted or other than a flat or horizontal surface. The surface 172 can be a non-uniform surface as part of the surface may be water, part of the surface may be a sloped surface and part of the surface may be a rough or uneven surface. The portable solar power system 100 is capable of adjusting the rotation and inclination of the solar panels to compensate for a tilted or an uneven surface 172.

The panel support 102B is coupled to the base 102A with at least one hinging coupling 106. The hinging coupling(s) 106 allow the panel support 102B to form a variable inclination angle α between the base 102A and the panel support. The inclination angle α can be between about 20 degrees and about 90 degrees.

The support strut 102C includes a panel drive system 107. The panel drive system 107 is operative to move the panel support 102B along the length of the support strut 102C in directions 102C' and 102C'' and correspondingly adjust the inclination angle α between the base 102A and the panel support. The support strut 102C can be coupled to the panel support 102B at any suitable position such as a top cross member 102B' or one of the other cross members 102B' or one of the vertical members 102B''. It should be noted that while two vertical members 102B'' and four cross members 102B' are illustrated, additional or fewer vertical members and cross members 102B' can be included. By way of example, one, three, five or more vertical members 102B'' can be included in the panel support 102B. Similarly, one, two, three, four, five or more cross members 102B' can be included in the panel support 102B.

Each of the multiple solar panels 104A-H can be separated by from an adjacent solar panel in one of more directions. By way of example, solar panel 104B can be offset laterally, and in a common plane, from solar panel 104C by a distance D1 between about 1 cm and about 25 cm, as shown in FIG. 1A. Alternatively or additionally, solar panel 104A can be offset in a substantially parallel plane from solar panel 104B by a distance D2 between about 1 cm and about 25 cm, as shown in FIG. 1B. Similarly, solar panel 104F can be offset laterally, and in a common plane, from solar panel 104B by a distance D3 between about 1 cm and about 25 cm, as shown in FIG. 1A, and/or offset in a substantially parallel plane from solar panel 104B by a distance D2 between about 1 cm and about 25 cm, as shown in FIG. 1B. The offset distances D1, D2, D3 allow for precipitation and wind to more easily pass through the portable solar power system 100 and thus minimizing the force of the precipitation and wind applied against the portable solar power system.

The portable solar power system 100 can optionally include a self cleaning system 112 including a cleaning brush 112A and a brush support/drive 112B. The self cleaning system 112 allows the portable solar power system 100 to remove contamination (e.g., snow, ice, dust, leaves, etc.) that may become deposited on the surface of the solar panels 104A-H. The cleaning brush 112A can be any suitable brush, sponge, squeegee, or other suitable device for removing the contamination or combinations thereof. The brush support/drive 112B drives the cleaning brush 112A across the surface of the solar panels 104A-H. In at least one embodiment, the brush support/drive 112B can spin the cleaning brush 112A in directions 112F and 112F'. In at least one embodiment, the brush support/drive 112B can move the cleaning brush 112A in directions 112G, 112G' across the surface of the solar panels 104A-H.

The self cleaning system 112 can be a dry system using a dry cleaning brush to brush or sweep away the contamination from the surface of the solar panels 104A-H. Alternatively or additionally, the self cleaning system 112 can be a wet system including one or more perimeter spray nozzles 112C disposed along the perimeter of the solar panels 104A-H and/or one or more integral spray nozzles 112D disposed within the brush 112A. The perimeter spray nozzles 112C and/or one or more integral spray nozzles 112D of the wet self cleaning system 112 are coupled to a cleaning solution source 112E.

The cleaning solution source 112E can provide water or other suitable cleaning solution (e.g., suitable de-icing solution and/or glass cleaner) and combinations thereof. The cleaning solution source 112E can also condition the cleaning solution such as heating and/or mixing two or more ingredients to produce the desired cleaning solution. By way of example, the cleaning solution source 112E can mix water with a concentrated cleaning solution to produce the cleaning solution.

The tracking drive system 130 includes the wheel drive system 105 and the panel drive system 107. Each of the wheel drive system 105 and the panel drive system 107 can optionally include position feedback sensors to provide position data back to the controller 135.

Figure 2A:
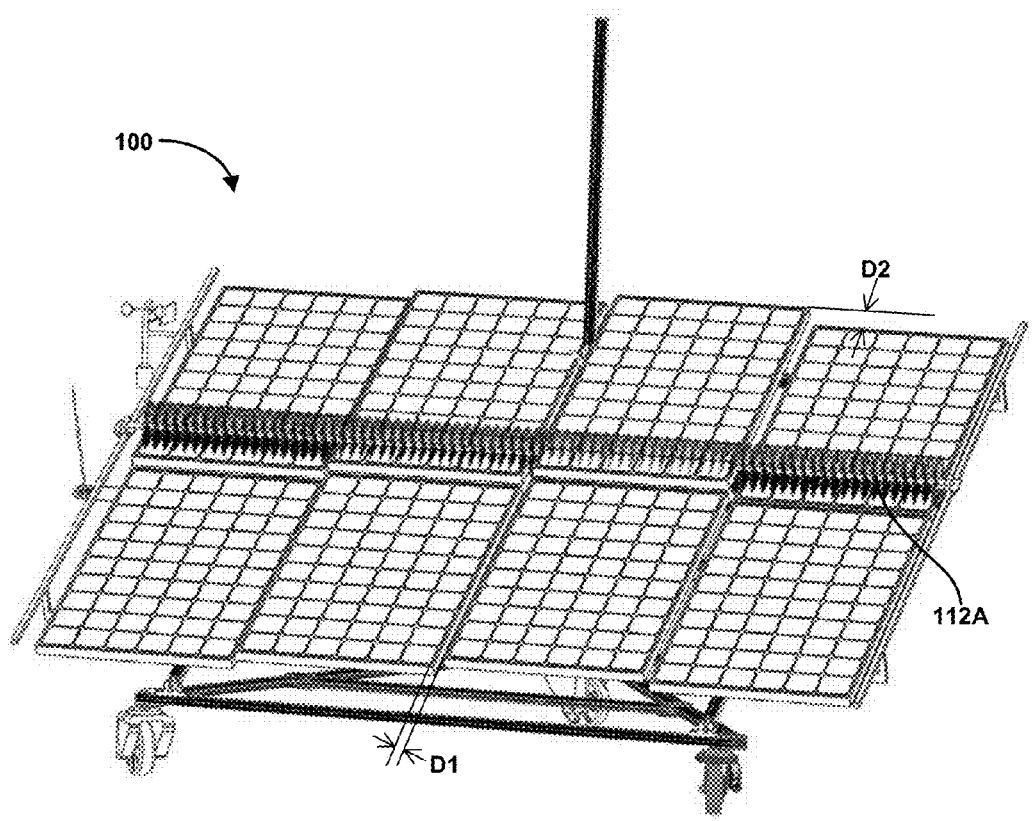
FIG. 2A is a front view of a portable solar power system approaching a minimal inclination angle α between the base and the panel support, in accordance embodiments of the present invention.

FIG. 2A is a front view of a portable solar power system 100 approaching a minimal inclination angle α between the base 102A and the panel support 102B, in accordance embodiments of the present invention. The minimal inclination angle α between the base 102A and the panel support 102B is typically used when the sun is substantially directly above the solar panels 104A-H or when the solar panels are in a storage or lowered position such as for protection from excessive wind or for maintenance or other purposes.

Figure 2B:
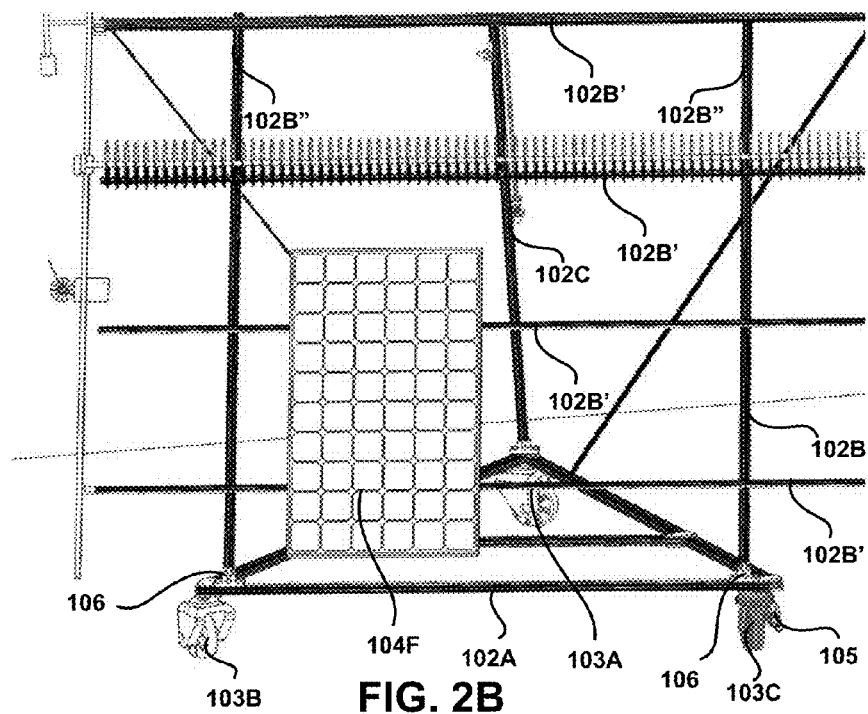
FIG. 2B is a front view of a portion of the panel support, in accordance embodiments of the present invention.
Figure 2C:
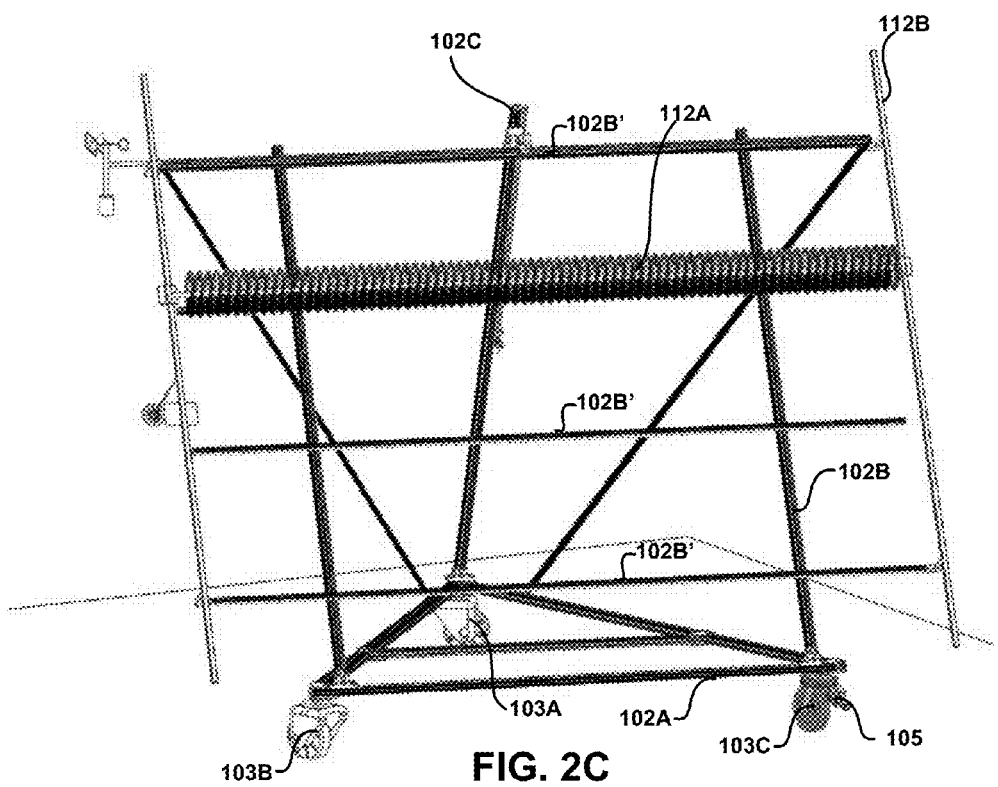
FIG. 2C is a front view of the panel support, in accordance embodiments of the present invention.

FIG. 2B is a front view of a portion of the panel support 102B, in accordance embodiments of the present invention. FIG. 2C is a front view of the panel support 102B, in accordance embodiments of the present invention. The multiple solar panels 104A-H are mounted on the cross members 102B' and vertical members 102B" of the panel support 102B.

Figure 3:
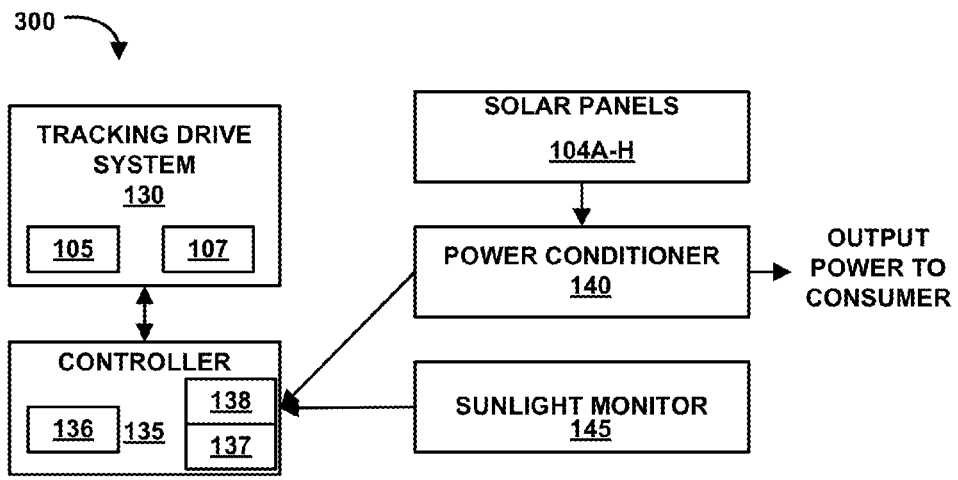
FIG. 3 is a simplified block diagram of a tracking system, in accordance embodiments of the present invention.

FIG. 3 is a simplified block diagram of a tracking system 300, in accordance embodiments of the present invention. The tracking system 300 includes a controller 135 coupled to a tracking drive system 130 and a sunlight monitor 145.

The controller 135 can be mounted on the portable solar power system 100 or coupled to the portable solar power system via a wired or wireless connection. The sunlight monitor 145 is mounted on the portable solar power system 100 in any suitable position. Alternatively, the sunlight monitor 145 can be mounted separately from the portable solar power system 100.

FIGS. 4A-C are simplified diagrams of the sunlight monitor 145, in accordance with embodiments of the present invention. The sunlight monitor 145 includes a light sensitive element 152 housed within an enclosure 154. The enclosure includes at least one tunnel 146A-C. The tunnel(s) 146A-C limit a sunlight detection angle θ at which sunlight can directly impinge on the light sensitive element 152 to between about 2 and about 20 degrees. In more preferred embodiment the sunlight detection angle θ is less than about 5 degrees. As a result, adjusting the angle of the tunnel(s) 146A-C to provide a maximum output of the light sensitive element 152 indicates the tunnel(s) are within about 5 degrees of being directed in line with sunlight emitted from the sun or other suitable solar power source.

The controller 135 can adjust the rotation of the portable solar panel system 100 toward the sun even if the sunlight monitor 145 is directed away from the sun by more than about 120 degrees. The output of the sunlight monitor 145 has a curve relative to the amount of light is detected by the light sensitive element 152. Initially, the controller 135 determines an initial level of output from the sunlight monitor 145 in the initial position. The controller 135 then instructs the portable solar panel system 100 to rotate in a first direction a pre-selected number of degrees to a second position. The first direction can be toward the east or toward the west. The pre-selected number of degrees can be between about 5 and about 20 degrees. Less than 5 degrees could be used but the process could be more lengthy.

The controller 135 determines a second level of output from the sunlight monitor 145 in the second position. If the second level is greater than the initial level, then the controller instructs the portable solar panel system 100 to rotate in the first direction the pre-selected number of degrees to a third position and evaluates a third level of output from the sunlight monitor.

As long as a subsequent level of output from the sunlight monitor 145 continues to be greater than an immediately preceding level of output, the controller 135 instructs the portable solar panel system 100 to rotate in the first direction and compare output levels of the sunlight monitor. When the output of the sunlight monitor decreases in a subsequent position, then the controller 135 instructs the portable solar panel system 100 to rotate in a second direction, opposite the first direction and compare output levels of the sunlight monitor 145. As a result, the controller 135 will instruct the portable solar panel system 100 to rotate in to the first direction until the level of output from the sunlight monitor 145 drops off. Basically, the controller 135 will have instructed the portable solar panel system 100 to over shoot past an optimum orientation toward the sun. Then the portable solar panel system 100 will rotate back in the second direction and repeat the process at ever smaller rotation angles until a peak output of the sunlight monitor 145 is detected.

However, if the second level of output of the sunlight monitor 145 is less than the initial level of output, then the controller 135 instructs the portable solar panel system 100 to rotate in the second direction, opposite the first direction, and again compare output levels of the sunlight monitor 145. As long as a subsequent level of output from the sunlight monitor 145 continues to be greater than an immediately preceding level of output, the controller 135 instructs the portable solar panel system 100 to rotate in the second direction and compare output levels of the sunlight monitor 145 until over shooting an optimum orientation toward the sun. Then the portable solar panel system 100 will rotate back in the first direction and repeat the process at ever smaller rotation angles until a peak output of the sunlight monitor 145 is detected.

Once an optimum orientation toward the sun in rotation angle is determined, a similar process can be utilized to adjust the inclination angle α until an optimum inclination angle α is determined. For further fine tuning of the optimum orientation toward the sun the controller can use the above rotation and inclination angle processes in smaller increments less than about 5 degrees (e.g., about 2 degrees). Once optimum orientation toward the sun is determined, the controller 135 can adjust the rotation, translation and angle on inclination as described elsewhere herein.

FIG. 4D is a simplified diagram of an alternative sunlight monitor 145', in accordance with embodiments of the present invention. The alternative sunlight monitor 145' functions substantially like a sundial such that the sunlight casts a shadow 162 of the needle 160 across the sundial base 161. The position of the shadow 162 relative to the sundial base 161 can determine the relative location of the sun. The position of the shadow 162 relative to the sundial base 161 can be monitored by an external camera directed toward the sundial base. Alternatively, the position of the shadow 162 relative to the sundial base 161 can be detected by multiple light sensors 161A included in the sundial base.

Figure 5:
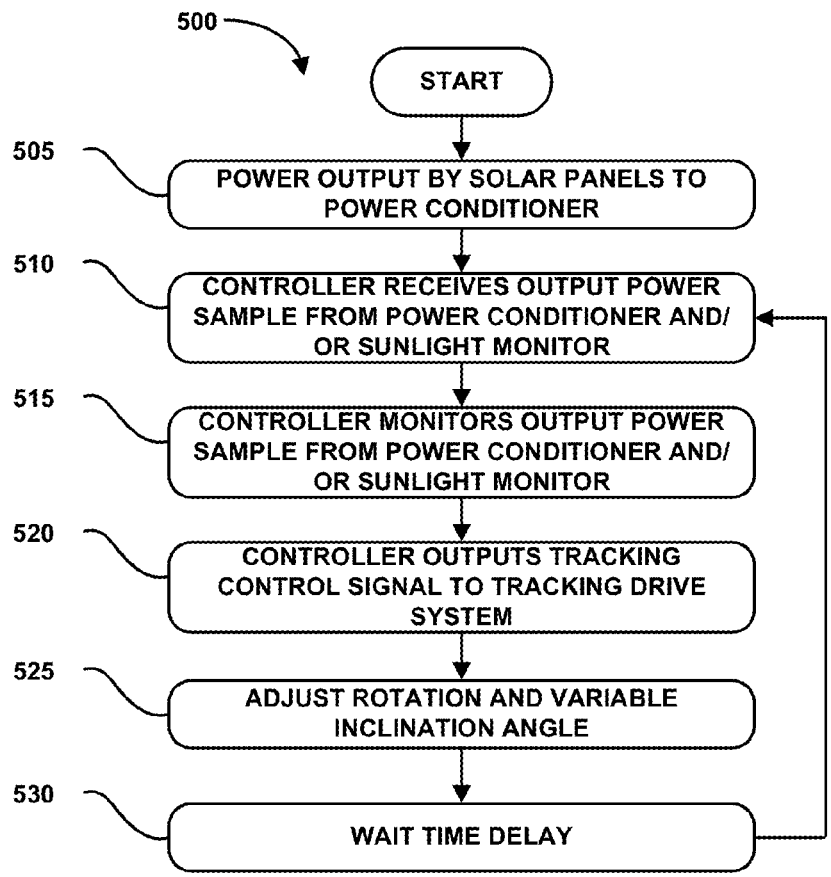
FIG. 5 is a flowchart diagram of the method operations for tracking sunlight with the portable solar power system, in accordance with embodiments of the present invention.

FIG. 5 is a flowchart diagram of the method operations 500 for tracking sunlight with the portable solar power system 100, in accordance with embodiments of the present invention. The operations illustrated herein are by way of example, as it should be understood that some operations may have sub-operations and in other instances, certain operations described herein may not be included in the illustrated operations. With this in mind, the method and operations 500 will now be described In an operation 505, the solar panels 104A-H output power to a power conditioner 140. The power conditioner 140 conditions the power from the solar panels 104A-H to be suitable for use by the consumer. By way of example, the power conditioner 140 can convert the direct current from the solar panels 104A-H to 110-220 volts alternating current at 50 or 60 cycles. The power conditioner 140 can also match impedance to the power consumer's power grid, if needed. The power conditioner 140 can also provide safety interlocks to connect/disconnect the solar panels 104A-H from the power consuming such as may be required to protect the solar panels in times of a power grid disruption (e.g., power spike, brown out or other problems) and to protect the power grid from problems with the portable solar power system 100 such as short circuits or other failures. The power conditioner 140 can be mounted on the portable solar power system 100 or coupled to the portable solar power system by one or more electrical cables.

The power conditioner 140 outputs a sample and/or indication of the power level received from the solar panels 104A-H to the controller 135, to initiate tracking, in an operation 510. The controller 135 monitors the output sample power and an output from the sunlight monitor 145, in an operation 515. The controller 135 can also include location of the portable solar power system 100 and almanac data to provide initial inclination angle α and directions (e.g., where to rotate the portable solar power system) for sunrise. The controller 135 can also include date and time and logic 137 for determining an initial orientation of the portable solar power system 100. Alternatively and/or additionally, the controller 135 can also include logic 138 for monitoring the output sample power and an output from the sunlight monitor 145.

The controller 135 can produce a tracking signal output to the tracking drive system 130, in an operation 520. In an operation 525, the tracking signal causes the panel drive system 107 to adjust the variable inclination angle α and the wheel drive system 105 to adjust the rotation of the portable solar power system 100 by driving one or more of the wheels 103A-C until one or both of the output sample power from the power conditioner 140 and/or the output from the sunlight monitor 145 are maximized. One or both of the wheel drive system 105 and the panel drive system 107 can provide positional feedback data to the controller 135 as the corresponding rotation of the portable solar power system and/or the variable inclination angle α changes.

The controller 135 can optionally include a time delay 136 before repeating operations 510-525 after the time delay, in an operation 530. By way of example, the time delay can be essentially zero seconds thus the controller 135 is continually refining the rotation and variable inclination angle α to maximize the output power of the solar panels 104A-H. Alternatively, the time delay can be up to between about 1 and about 20 minutes such that the controller 135 periodically adjusts the rotation and variable inclination angle α to maximize the output power of the solar panels 104A-H after the expiration of the time delay.

Figure 6A:
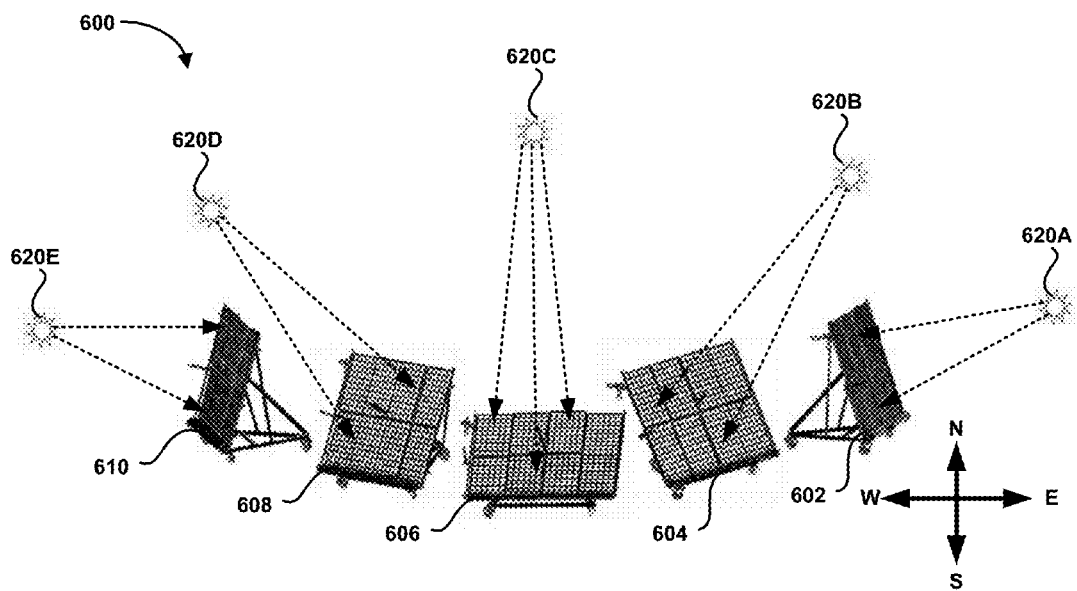
FIG. 6A is a time lapse diagram of the portable solar power system tracking the sun, in accordance with embodiments of the present invention.
Figure 6B:
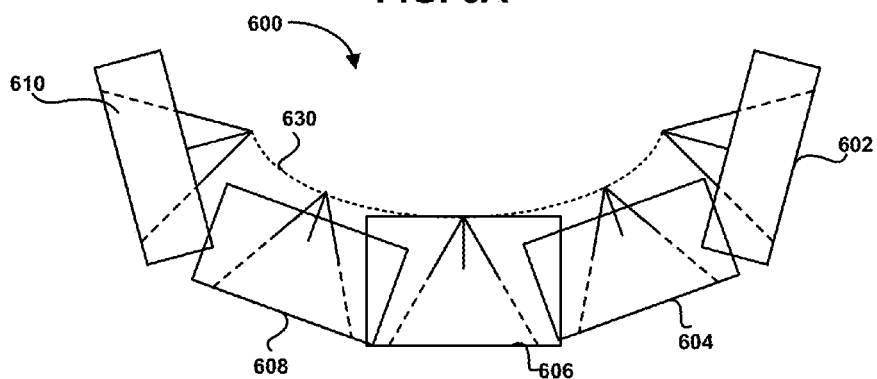
FIGS. 6B-D5 are views from above the portable solar power system through the time lapse tracking the sun, in accordance with embodiments of the present invention.

FIG. 6A is a time lapse diagram 600 of the portable solar power system 100 tracking the sun 620A-E, in accordance with embodiments of the present invention. FIGS. 6B-D5 are views from above the portable solar power system 100 through the time lapse tracking the sun 620A-E, in accordance with embodiments of the present invention.

The portable solar power system 100 is initially oriented at position 602 toward the sun 620A disposed in the east and near the horizon such as near sunrise. In the sunrise orientation, the portable solar power system 100 is rotated toward the east (E) and the angle on inclination α is nearing perpendicular to the ground.

The portable solar power system 100 is gradually rotated into a mid morning orientation 604, as the sun rises to a mid morning position 620B. In the mid morning orientation 604, the portable solar power system 100 is rotated toward the south, if located the northern hemisphere, and east and the angle on inclination α is nearing a mid point angle of inclination, relative to the ground. The mid point angle of inclination is approximately midway between the maximum inclination α at sunrise and a minimum inclination α at noon.

The portable solar power system 100 is gradually rotated into a noon orientation 606, as the sun rises to a noon position 620C. In the noon orientation 606, the portable solar power system 100 is rotated toward the south, if located the northern hemisphere, and the angle on inclination α is nearing at a minimum point angle of inclination, relative to the base 102B.

The portable solar power system 100 is gradually rotated into a mid afternoon orientation 608, as the sun begins to pass into a mid afternoon position 620D. In the mid afternoon orientation 608, the portable solar power system 100 is rotated toward the south, if located the northern hemisphere, and west and the angle on inclination α is nearing a mid point angle of inclination, relative to the ground.

The portable solar power system 100 is eventually oriented at position 610 toward the sun 620E disposed in the west and near the horizon such as near sunset. In the sunset orientation, the portable solar power system 100 is rotated toward the west (W) and the angle on inclination α is nearing perpendicular to the ground.

Referring to FIG. 6B, the portable solar power system 100 can be translated laterally in directions 650A and 650B along an arc 630, as shown, as the portable solar power system tracks the Sun though positions 620A-E. The arc 630 can have any desired radius. The arc 630 can be a substantially straight line as may be necessary to move the portable solar panel system 100 away from a shaded location. By way of example, the portable solar panel system 100 can be moved away from a tree or a building that may cast a shadow on a portion of the solar panels 104A-G as the sun transits the sky.

Alternatively, the portable solar power system 100 can pivot around a fixed point such as wheel 103A, as shown in FIGS. 6C1-C5. Alternatively, the portable solar power system 100 can pivot around a more centralized point 150, as shown in FIGS. 6D1-D5. It should be understood that the portable solar power system 100 can pivot around any fixed point such as any one of the wheels 103A-C or another point within the footprint or on or near the perimeter of the base 102A. It should also be understood that if the portable solar power system 100 were located in the southern hemisphere the mid morning, noon and mid afternoon orientations 604-608 may be altered to a more northward direction. The precise direction and angle of inclination α relative to the position of the sun 620A-E is determined by the sunlight monitor as discussed above in FIGS. 4A-D.

Figure 7A:
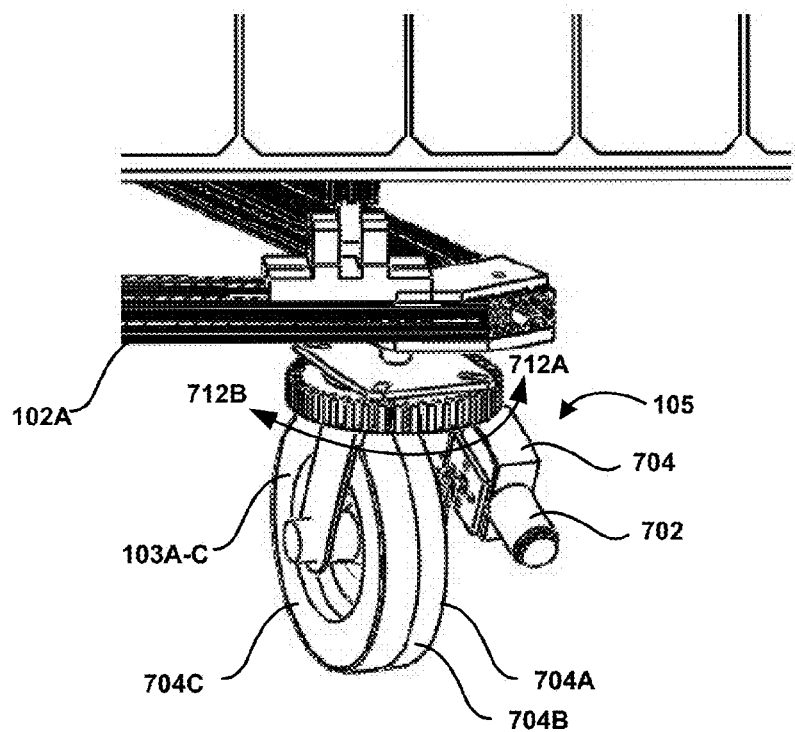
FIGS. 7A and 7B are more detailed schematic diagrams of the wheel drive system, in accordance with embodiments of the present invention
Figure 7B:
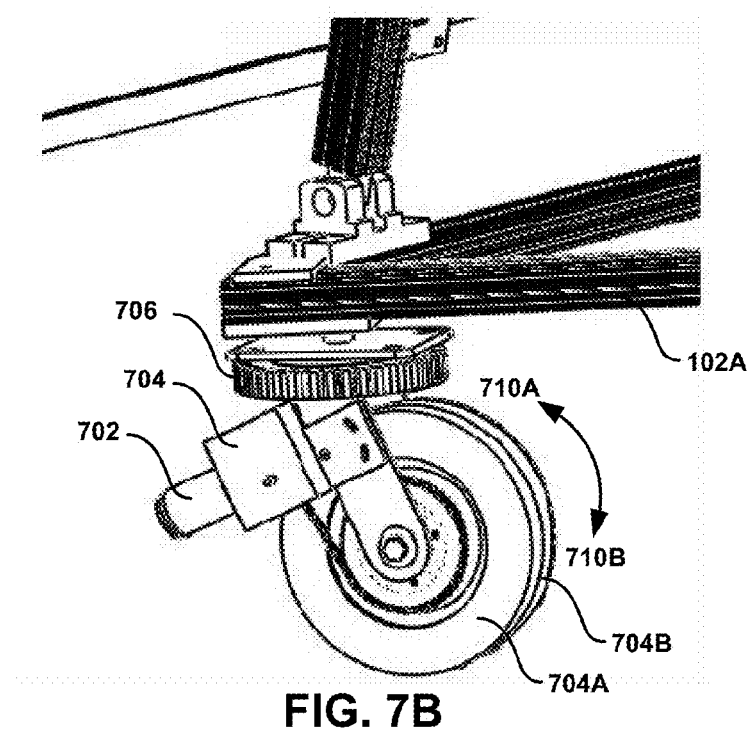

FIGS. 7A and 7B are more detailed schematic diagrams of the wheel drive system 105, in accordance with embodiments of the present invention. The wheel drive system 105 can be mounted to any one or more of the three or more wheels 103A-C. The wheel drive system 105 includes a drive motor 702, a wheel drive gear system 704 and a wheel steering system 706.

The wheel drive gear system 704 couples the drive motor 702 to the wheel 103A-C. The wheel drive gear system 704 can include one or more of and combinations of a sprocket and chain set, as shown, a gear drive set, a worm gear set, or a pneumatic or hydraulic system or a friction drive system acting directly on one or more surfaces 704A-C of the wheel 103A-C. The drive motor 702 drives the wheel 103A-C in directions 710A and 710B, as directed by the controller 135.

The wheel drive gear system 704 can also include a wheel drive position feedback system to feed wheel position data back to the controller 135. The wheel drive gear system 704 can optionally include a braking system capable of locking the wheel 103A-C.

The wheel steering system 706 couples the wheel drive system 105 to the base 102A. The wheel steering system 706 can include one or more of a chain and sprockets set, a gear drive set, a worm gear set or a friction drive system, or a pneumatic or hydraulic system or combinations thereof. The drive motor 702 steers the wheel 103A-C in directions 712A and 712B, as directed by the controller 135.

The wheel steering system 706 can also include a wheel steering position feedback system to feed wheel steering position data back to the controller 135. The wheel steering system 706 can optionally include a braking system capable of preventing the rotation of the wheel 103A-C.

FIGS. 8A-C are more detailed schematic diagrams of the panel drive system 107, in accordance with embodiments of the present invention. The panel drive system 107 is mounted on one or both of the support strut 102C and/or the panel support 102B. One embodiment of the panel drive system 107 includes a panel drive motor 802, a panel drive gear system 804, a panel drive follower 806 and a panel coupler 808.

The panel drive gear system 804 couples the panel drive motor 802 to the panel drive follower 806. The panel drive gear system 804 can include one or more of and combinations of a sprocket and chain set, a gear drive set, a worm or screw gear set, as shown, or a cable and pulley system or a pneumatic or hydraulic system.

The panel drive follower 806 is coupled to the panel support 102B and the panel drive gear system 804. The panel drive follower 806 can also include a flexible coupling 808 that allows the panel drive follower to flex as the angle of inclination α changes.

The panel drive motor 802 turns the panel drive gear system 804 in directions 810A and 810B, thus moving the panel drive follower 806 and correspondingly, the panel support 102B in directions 102C' and 102C", as needed. Moving the panel support 102B in directions 102C' and 102C" varies the angle of inclination α.

The panel drive gear system 804 can also include a panel drive position feedback system to feed panel position data back to the controller 135. The panel drive gear system 804 can optionally include a braking system capable of locking one or both of the panel drive gear system 804 and/or the panel drive follower 806.

It should be understood that the panel drive motor 802 can be mounted on the panel support 102B and the panel drive follower 806 can be mounted on the support strut 102C. Alternatively, the panel drive system 107 can include a hydraulic or pneumatic lift system such as pistons moving within cylinders under pressurized air or other fluids or any other suitable drive system to move the panel support 102B in directions 102C' and 102C".

FIG. 8A also shows optional stabilizers 840. The stabilizers 840 provide additional support to the panel support 102B and can assist in minimizing panel flex due to wind, rain or snow loads and stresses and combinations thereof. The stabilizers 840 can include one or more stabilizers. The stabilizers 840 can be rigid material similar to the structure of the panel support 102B. Alternatively or additionally, the stabilizers 840 can include flexible straps or lines such as metal or textile cables or straps. The stabilizers 840 can include automatic tensioning devices to maintain a desired tension on the stabilizers. By way of example, if the stabilizers 840 are a flexible straps or lines such as metal or textile cables, one or both ends of the stabilizer can include a spring loaded reel providing the desired tension on the stabilizer.

While it is shown that each of the cross members 102B', vertical members 102B", the support strut 102C and the base 102B are approximately the same dimension material, it should be understood that many different dimensions of materials may be used for the various support structure portions.

Figure 8D:
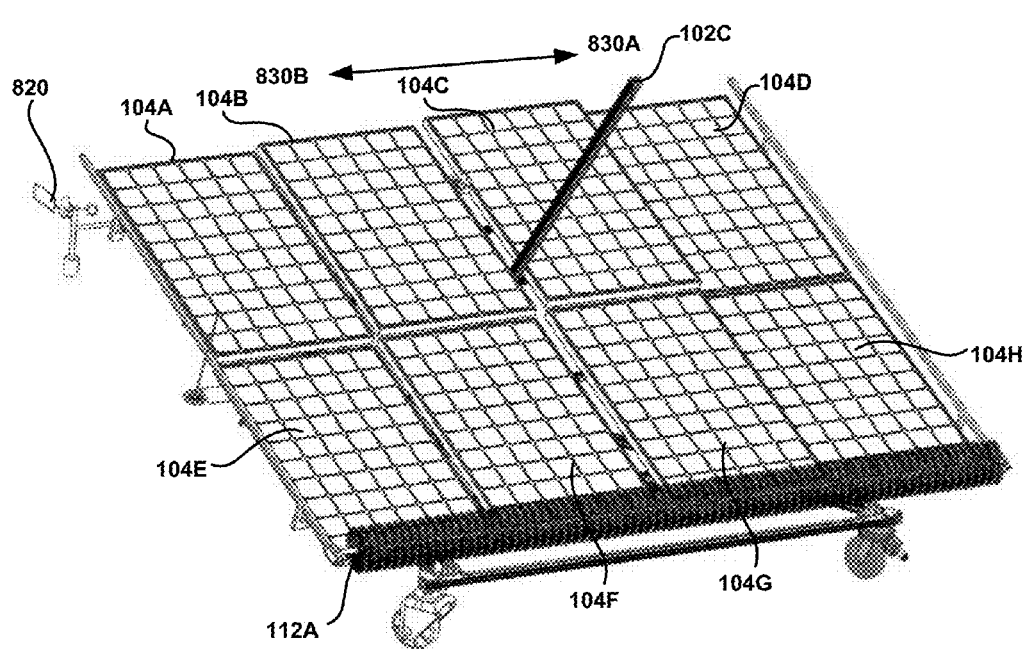
FIG. 8D illustrates the portable solar power system in a storage or safe orientation, in accordance with embodiments of the present invention.

FIG. 8D illustrates the portable solar power system 100 in a storage or safe orientation 850, in accordance with embodiments of the present invention. The portable solar power system 100 is lowered to minimum angle of inclination α to the storage or safe orientation 850 to minimize the possibility of damage caused by high speed winds. Placing the portable solar power system 100 in the storage or safe orientation 850 can also include rotating the portable solar power system relative to the wind direction so as to minimize the wind resistance of the portable solar power system.

By way of example, the minimum wind resistance may be such that the wind passes across the panels 104A-H in directions 830A and 830B.

Placing the portable solar power system 100 in the storage or safe orientation 850 can also include moving the cleaning brush 112A to a desired position such as along the bottom edge of panels 104E-H as shown.

Figure 8E:
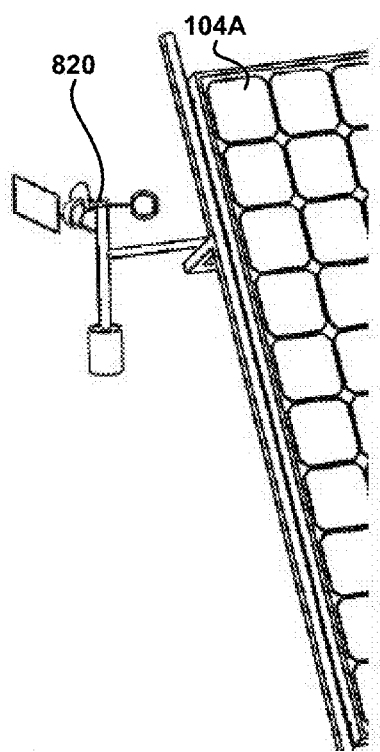
FIG. 8E illustrates an optional wind speed and direction detector, in accordance with embodiments of the present invention.

FIG. 8E illustrates an optional wind speed and direction detector 820, in accordance with embodiments of the present invention. The portable solar power system 100 can include the wind speed and direction detector 820 mounted on the pane support 102B and electrically coupled to the controller 135. Alternatively, the controller 135 can receive wind speed and direction information from another wired or wirelessly coupled source such as a local weather website of a remote control or a remote web enabled user controller.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 9:
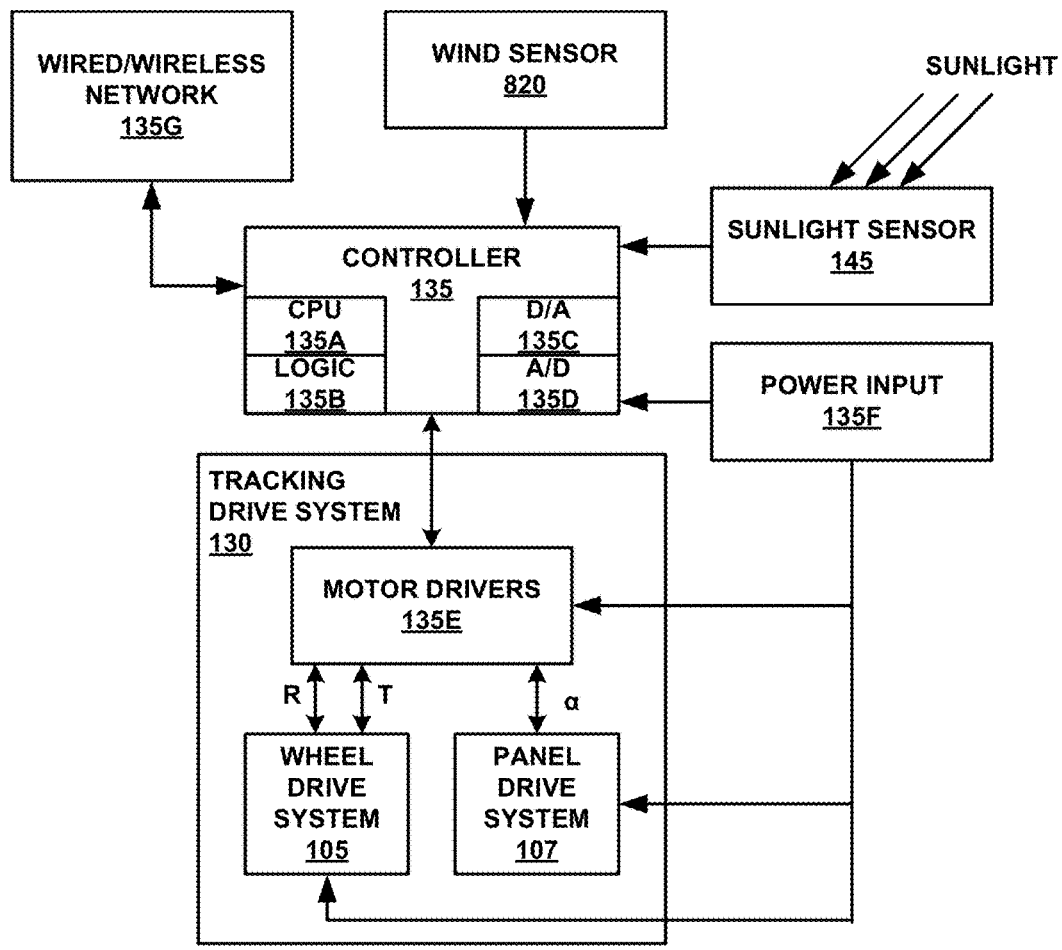
FIG. 9 is a block diagram of the controller and the portable solar panel system, in accordance with embodiments of the present invention.

FIG. 9 is a block diagram of the controller 135 and the portable solar panel system 100, in accordance with embodiments of the present invention. The controller 135 includes a central processing unit 135A and logic 135B. Additional components can also included in the controller 135 as will be described in more detail in FIG. 10 below. The logic 135B includes software, firmware and hardware logic to perform the desired functions. The controller 135 includes an input for power from a power source 135F such as the power conditioner 140 as described above. The controller 135 also includes an input from the sunlight monitor 145 and the wind sensor 820. Other sensors can also be coupled to the controller 135. The inputs from the sunlight monitor 145 and the wind sensor 820 and other sensors can be digital or analog and then be converted, as needed, by the A/D converter 135D. The A/D converter 135D can convert analog data from any other input to the controller 135 as well.

The controller 135 is also coupled to one or more networks 135G. The one or more networks 135G can be wired (e.g., local area network, Internet, etc.) or wireless (e.g., wireless area network, Bluetooth or other well known or proprietary wireless network protocols).

The controller 135 is also coupled to one or more motor drivers 135E. The motor drivers 135E provide the drive current needed to drive the wheel drive system 105 and the panel drive system 107 in response to commands from the controller 135. The controller 135 can provide movement commands to the wheel drive system 105 to adjust the rotation and lateral movement of the portable solar panel system 100. The controller 135 can provide movement commands to the panel drive system 107 to change the angle of inclination α. The controller 135 can receive position data from the wheel drive system 105 and the panel drive system 107. The controller 135 can also receive sunlight input signal (e.g., highest voltage corresponding to most direct alignment with the sun) from the sunlight monitor 145.

Figure 10:
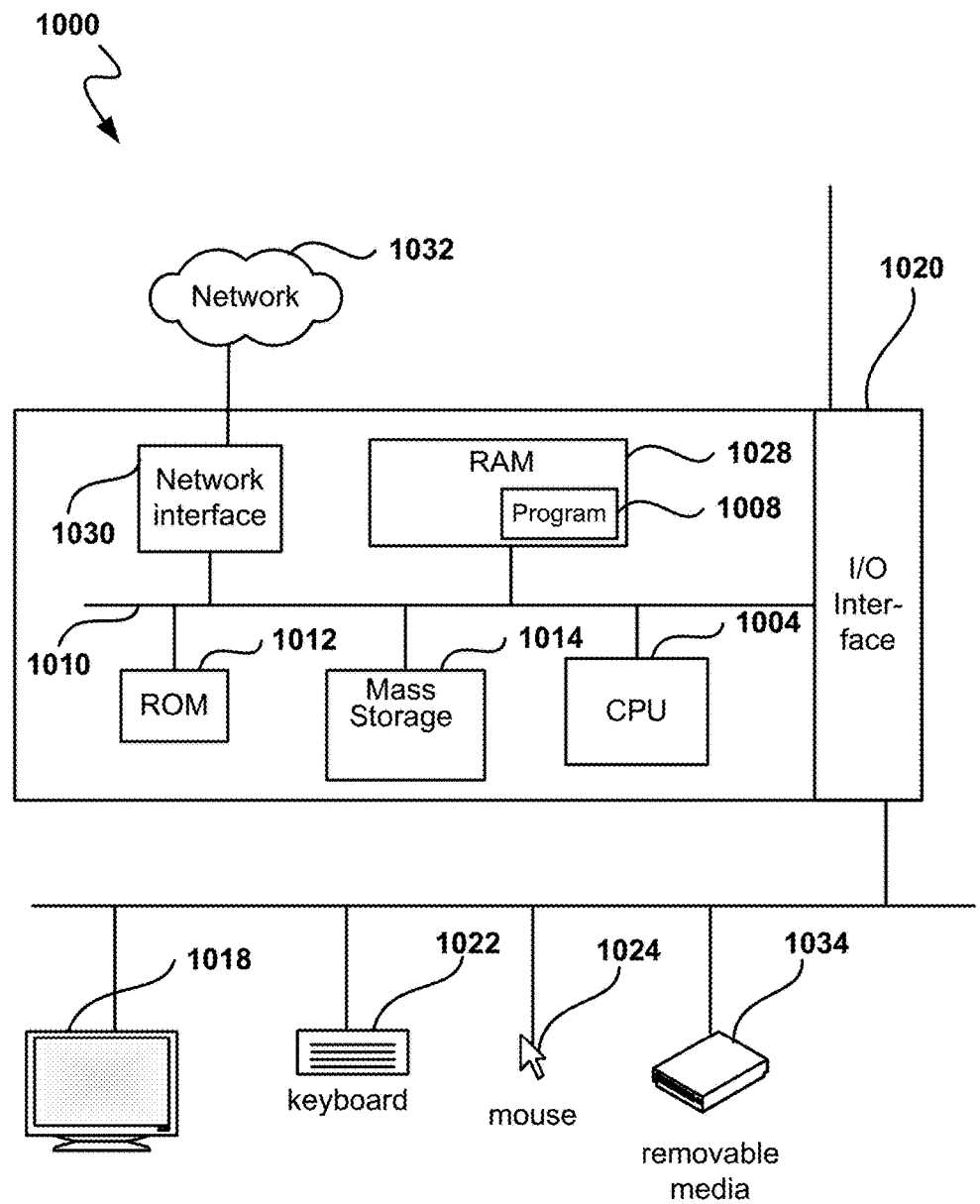
FIG. 10 is a block diagram of an exemplary computer system for carrying out the processing, in accordance with at least one embodiment of the present invention.

FIG. 10 is a block diagram of an exemplary computer system 1000 for carrying out the processing, in accordance with at least one embodiment of the present invention. The controller 135 can include a general or specialized computer system such as the computer system 1000. The computer system 1000 includes a computer 1002, a display screen 1004, an optional printer 1006 or other output device, a removable media (e.g., magnetic/optical/flash) drive 1008, a hard disk drive 1010 or other suitable storage device, a network interface 1012, and a keyboard 1014. Additional user interface devices such as a mouse, a touch pad or touch screen can also be included.

The computer 1002 includes a processor 1016, a memory bus 1018, random access memory (RAM) 1020, read only memory (ROM) 1022, a peripheral bus 1024, and an input/output device 1026. The computer 1002 can be a personal computer (such as an IBM compatible personal computer, a Macintosh computer or Macintosh compatible computer), a workstation computer (such as a Sun Microsystems or Hewlett-Packard workstation), or some other suitable type of computer.

The processor 1016 can be a general purpose digital processor or a specially designed processor. The processor 1016 controls the operation of the computer system 1000. Using instructions retrieved from memory, the microprocessor 1016 controls the reception and manipulation of input data and the output and display of data on output devices.

The memory bus 1018 is used by the processor 1016 to access the RAM 1020 and the ROM 1022. The RAM 1020 is used by the processor 1016 as a general storage area and as scratch-pad memory, and can also be used to store input data and processed data. The RAM 1020 and the ROM 1022 can be used to store computer readable instructions or program code readable by the microprocessor 1016 as well as other data.

The peripheral bus 1024 is used to access the input, output, and storage devices used by the computer 1002. These devices include the display screen 1004, the printer device 1006, the removable media drive 1008, the hard disk drive 1010, and the network interface 1012. The input/output device 1026 is used to receive input from keyboard 1014 and send decoded symbols for each pressed key to processor 1016 over bus 1028.

The display screen 1004 is an output device that displays images of data provided by the processor 1016 via the peripheral bus 1024 or provided by other components in the computer system 1000. The printer device 1006, when operating as a printer, provides an image on a sheet of paper or a similar surface. Other output devices such as a plotter, projector, etc. can be used in place of, or in addition to, the printer device 1006.

The removable media drive 1008 and the hard disk drive 1010 can be used to store various types of data. The removable media drive 1008 facilitates transporting such data to other computer systems, and hard disk drive 1010 permits fast access to large amounts of stored data. The hard disk drive 1010 may be included within the computer system or may be external to the computer system such as network attached storage or cloud storage accessible over one or more networks (e.g., local area networks, wide area networks, wireless networks, Internet) or combinations of such storage devices and locations.

The processor 1016 together with an operating system operate to execute computer readable code and logic and produce and use data. The computer code, logic and data may reside within the RAM 1020, the ROM 1022, or the hard disk drive 1010 or other media storage devices and combinations thereof. The computer code and data could also reside on a removable program medium and loaded or installed onto the computer system 1000 when needed. Removable program media include, for example, DVD, CD-ROM, PC-CARD, floppy disk, flash memory, optical media and magnetic disk or tape.

The network interface 1012 is used to send and receive data over a network connected to other computer systems. An interface card or similar device and appropriate software implemented by the processor 1016 can be used to connect the computer system 1000 to an existing network and transfer data according to standard protocols such as local area networks, wide area networks, wireless networks, Internet and any other suitable networks and network protocols.

The keyboard 1014 is used by a user to input commands and other instructions to the computer system 1000. Other types of user input devices can also be used in conjunction with the present invention. For example, pointing devices such as a computer mouse, a track ball, a stylus, touch pad, touch screen or a tablet can be used to manipulate a pointer on a screen of a general-purpose computer.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A photovoltaic solar panel system comprising:

a support structure;

at least two photovoltaic solar panels mounted on a panel support coupled to the support structure, wherein each one of the at least two photovoltaic solar panels are mounted in substantially parallel planes, wherein the substantially parallel planes are offset to allow wind and precipitation to pass between the at least two photovoltaic solar panels;

at least three wheels coupled to the support structure and rotatably supporting the support structure on an uneven surface;

a controller;

a sunlight monitor coupled to the controller;

a tracking drive system coupled to the controller and mechanically linked to at least one of the at least three wheels, wherein at least one of the at least three wheels is configured to be driven to rotate the support structure around a selected fixed point to achieve a desired output from the sunlight monitor; and a rotation and an inclination angle adjusting system coupled between the support structure and the panel support of the at least two photovoltaic solar panels, the rotation and the inclination angle adjusting system for adjusting the rotation and the inclination angle between the support structure and the panel support of the at least two photovoltaic solar panels to compensate for the uneven surface.

2. The photovoltaic solar panel system of claim 1, wherein the support structure includes a base and the panel support flexibly coupled to the base.

3. The photovoltaic solar panel system of claim 2, wherein the tracking drive system includes a panel drive system coupled between the base and the panel support capable of selectively varying the inclination angle between the base and the panel support.

4. The photovoltaic solar panel system of claim 1, wherein the support structure includes a base, the panel support flexibly coupled to the base and a support strut.

5. The photovoltaic solar panel system of claim 1, wherein the support structure includes a base, the panel support flexibly coupled to the base and at least one stabilizer.

6. The photovoltaic solar panel system of claim 1, further comprising a power conditioner coupled to the at least one solar panel.

7. The photovoltaic solar panel system of claim 1, wherein the sunlight monitor is mounted on the support structure.

8. The photovoltaic solar panel system of claim 1, wherein the sunlight monitor includes a light sensitive element and at least one tunnel.

9. The photovoltaic solar panel system of claim 1, wherein the sunlight monitor includes a sunlight detection angle of between about 2 and about 20 degrees.

10. The photovoltaic solar panel system of claim 1, wherein the controller includes logic for driving at least one of the at least three wheels to rotate the support structure to achieve a desired output from the sunlight monitor.

11. A method for tracking sun with a portable photovoltaic solar panel system comprising:
the portable photovoltaic solar panel system including:
a support structure;
at least two photovoltaic solar panels mounted on a panel support coupled to the support structure, wherein each one of the at least two photovoltaic solar panels are mounted in substantially parallel planes, wherein the substantially parallel planes are offset to allow wind and precipitation to pass between the at least two photovoltaic solar panels;
at least three wheels coupled to the support structure and rotatably supporting the support structure on an uneven surface;
a controller;
a sunlight monitor coupled to the controller; and
a tracking drive system coupled to the controller and mechanically linked to at least one of the at least three wheels;
driving at least one of the at least three wheels to rotate the support structure around a selected fixed point to achieve a desired output from the sunlight including adjusting a rotation and an inclination angle between the support structure and the panel support of the at least two photovoltaic solar panels to compensate for the uneven surface.

12. The method of claim 11, further comprising: varying the inclination angle between a base and the panel support of the support structure to achieve the desired output from the sunlight monitor.

13. The method of claim 11, wherein driving at least one of the at least three wheels to rotate the support structure to achieve a desired output from the sunlight monitor can also include laterally translating the support structure.

14. The method of claim 11, wherein driving at least one of the at least three wheels to rotate the support structure to achieve a desired output from the sunlight monitor can also include laterally translating the support structure and rotating the support structure around one or more selected fixed points.

15. The method of claim 11, further comprising:
detecting an adverse weather condition; and
minimizing the inclination angle between the support structure and the panel support.

16. The method of claim 11, further comprising:
detecting contamination on a surface of the at least one solar panel; and
cleaning the surface of the at least one solar panel.

17. A method for tracking sun with a portable photovoltaic solar panel system comprising:
the portable photovoltaic solar panel system including:
a support structure;
at least two photovoltaic solar panels mounted on a panel support coupled to the support structure, wherein each one of the at least two photovoltaic solar panels are mounted in substantially parallel planes, wherein the substantially parallel planes are offset to allow wind and precipitation to pass between the at least two photovoltaic solar panels;
at least three wheels coupled to the support structure and rotatably supporting the support structure on an uneven surface;
a controller;
a sunlight monitor coupled to the controller; and
a tracking drive system coupled to the controller and mechanically linked to at least one of the at least three wheels;
driving at least one of the at least three wheels to rotate the support structure around a selected fixed point to achieve a desired output from the sunlight monitor including adjusting a rotation and an inclination angle between the support structure and the panel support of the at least two photovoltaic solar panels to compensate for the uneven surface.

18. A photovoltaic solar panel system comprising:
a support structure having a base and a panel support flexibly coupled to the base;
at least two photovoltaic solar panels mounted on the panel support, wherein each one of the at least two photovoltaic solar panels are mounted in substantially parallel planes, wherein the substantially parallel planes are offset to allow wind and precipitation to pass between the at least two photovoltaic solar panels;
a controller; and
an inclination angle adjusting system coupled between the support structure and the panel support of the at least two photovoltaic solar panels, the inclination angle adjusting system including a control input from the controller for adjusting the inclination angle between the support structure and the panel support of the at least two photovoltaic solar panels.

* * * * *